United States Patent
Judd et al.

(10) Patent No.: US 10,247,850 B1
(45) Date of Patent: Apr. 2, 2019

(54) LOW NOISE, HIGH BANDWIDTH, HIGH SENSITIVITY LASER SEISMOMETER

(71) Applicant: Triad National Security, LLC, Los Alamos, NM (US)

(72) Inventors: Stephen Judd, Los Alamos, NM (US); Gerald Seitz, Los Alamos, NM (US); Michael Shinas, Los Alamos, NM (US); Matthew Briggs, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/709,763

(22) Filed: Sep. 20, 2017

Related U.S. Application Data

(60) Provisional application No. 62/400,462, filed on Sep. 27, 2016.

(51) Int. Cl.
   *G01V 8/14* (2006.01)
(52) U.S. Cl.
   CPC ..................................... *G01V 8/14* (2013.01)
(58) Field of Classification Search
   CPC .......................... G01B 9/02001; G01B 9/0201
   See application file for complete search history.

(56) References Cited

U.S. PATENT DOCUMENTS

| | | | |
|---|---|---|---|
| 6,763,151 B1* | 7/2004 | Bosso | G02F 1/0356 385/1 |
| 2011/0283795 A1* | 11/2011 | Littler | G01H 9/004 73/514.26 |
| 2012/0247213 A1* | 10/2012 | Zumberge | G01H 9/00 73/653 |

* cited by examiner

*Primary Examiner* — Jonathan M Hansen
(74) *Attorney, Agent, or Firm* — LeonardPatel PC; Michael Aristo Leonard, II; Sheetal Suresh Patel

(57) ABSTRACT

A laser seismometer may measure the change in a phase modulated optical signal. Unlike traditional interferometers, the laser phase is first modulated by a radio frequency (RF) source, which is then demodulated following detection to provide the signal of interest. The net result is a direct measurement of displacement with the effects of amplitude noise eliminated via limiting and the effects of 1/f phase noise (frequency drift, etc.) eliminated by self-interfering the signal. Because the signal-to-noise ratio (SNR) of the optical signal is strong, the technique provides a strong measure of the displacement and avoids the extremely low voltages and associated problems of traditional sensors.

17 Claims, 2 Drawing Sheets

LOW NOISE, HIGH BANDWIDTH, HIGH SENSITIVITY LASER SEISMOMETER

CROSS REFERENCE TO RELATED APPLICATION

This application claims the benefit of U.S. Provisional Patent Application No. 62/400,462 filed Sep. 27, 2016. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to seismometers, and more particularly, to a laser seismometer that measures the change in a phase modulated optical signal.

BACKGROUND

Currently, seismic measurements are most commonly made using geophones, which are rugged and work well at reasonable signal-to-noise ratios (SNRs) at higher frequencies, but have limited performance at low frequencies and lower SNRs. Digital microelectromechanical system (MEMS) sensors are also used, which have a wide bandwidth response, but a significantly higher noise floor compared to a geophone, and hence reduced sensitivity to small signals. Seismometers may also be employed, but are typically much more delicate, are more difficult to emplace, and are much more expensive (e.g., approximately $15,000 for a seismometer versus approximately $50-$100 for a geophone).

Seismic Sensor Overview

The most common seismic sensors use a proof mass suspended by a spring relative to a surrounding structure. New sensors using a fiber Bragg grating technique to measure ground motion are also becoming available, but are focused primarily on borehole type measurements. However, electromechanical systems remain the most prevalent. The entire assembly is placed in the ground, and as the Earth moves, the structure will move relative to the mass. The purpose of the sensor is to measure this relative motion between the mass and the structure, and from this measurement, deduce the motion of the Earth. As stated earlier, the motion levels can be very small (on the order of 10s of nanometers in some cases), the velocities are very small (typical units of nm/s), and the frequencies are low (down to well below 1 Hz).

The motion may be measured by measuring the relative displacement, velocity, or acceleration of the proof mass. Every sensor of this type has a resonant frequency, $\omega_0 = \sqrt{k/m}$, where k is the spring constant and m the proof mass. This determines several properties of the sensors of interest. The sensor response is given by the transfer function (impulse response) for a damped harmonic oscillator, which may be expressed in terms of displacement, velocity, or acceleration.

Intuitively, if the ground motion is sinusoidal at some frequency $\omega$, then the position x, velocity v, and acceleration a are given by $$x = \cos(\omega t) \tag{1}$$

$$v = \omega \cos(\omega t) \tag{2}$$

$$a = \omega^2 \cos(\omega t) \tag{3}$$

Thus, for a large $\omega$, a system measuring acceleration should be the most sensitive, but at low frequencies, velocity and acceleration sensitivity decrease quickly relative to a displacement measurement.

A geophone uses an inductive technique, namely, a coil surrounding a magnetic proof mass, and operates much like an audio speaker. As the coil moves relative to the magnet, from Faraday's law, $$V = -N\frac{d\Phi}{dt} = -N\frac{d\Phi}{dx}\frac{dx}{dt} \tag{4}$$

Where N is the number of turns. Hence, the sensor produces a voltage V that is proportional to the mass velocity.

Geophones work well and at relatively low cost, but have several fundamental limitations. One is noise, which will be discussed in the next section. Another relates to the transfer function. The mechanical sensitivity to acceleration is relatively constant below the resonant frequency. However, the electrical sensitivity decreases rapidly below the resonant frequency. Intuitively, low frequencies will result in low velocities, and hence, low voltages, which combines with increased noise at low frequencies to produce low sensitivity at low frequencies.

To overcome this limitation, a capacitive sensor is typically used. The mass motion changes the separation distance between two plates of a capacitor. By using the capacitor as a filter for an alternating current (AC) signal, the resulting signal envelope provides a measure of the capacitance. Hence, this type of capacitive sensor measures displacement instead of velocity. The system is highly nonlinear since the value of capacitance is inversely proportional to the distance between the plates, and a feedback loop is typically used to minimize the nonlinearities, provide higher dynamic range (to keep the plates from running into each other), and to improve noise performance. A commercial off-the-shelf (COTS) geophone has been modified by adding a capacitive sensing element to improve low frequency response and compared performance to a high-end capacitive seismometer, while a digital technique has also been demonstrated to improve low frequency sensitivity.

Intuitively, above the resonant frequency, the spring appears "soft," such that the mass/spring system reacts slowly to rapid changes in relative position. Below the resonant frequency, the spring appears "stiff," such that slow Earth motion results in very small changes in relative position. Thus, a system with a high resonant frequency will only detect accelerations at low frequency. This is the approach taken by a MEMS sensor. Although the sensor is capacitive with a feedback mechanism, the resonant frequency is very high, and the MEMS sensor is fundamentally an accelerometer. MEMS devices are generally rugged and compact and have a flat response over a wide bandwidth, but have a much higher noise floor, and hence, reduced sensitivity.

Noise and Sensitivity Limits

All of the traditional techniques have a fundamental problem in that they must measure an extremely small signal at very low frequencies, which must be done using inherently noisy and bandwidth-dependent amplifiers. Moreover, the sensing mechanisms themselves are inherently noisy due to kT noise generated within the mechanisms. The noise floor becomes particularly acute at low frequencies, as described below.

The two main sources of noise in seismic sensors are kT (or Johnson) noise and 1/f noise. kT noise is caused by random thermal fluctuations in electronic components, and increases with temperature. kT noise is present in the sensing coils and capacitors in the above designs, and gets worse as the coil and capacitor size increases. kT noise is also the primary noise source in amplifiers. kT noise is uniform in frequency space, and is zero mean.

Because the displacements/velocities/accelerations are so small, the resulting voltages that are generated are tiny, and control of thermal noise becomes critical. Most sensors attempt to control noise so that in some frequency range, it is lower than the Earth background noise. However, the noise typically becomes larger outside of that band.

Far more pernicious, however, is 1/f noise. 1/f noise is correlated such that it is not zero-mean. In other words, it will not average to zero. 1/f noise manifests itself in electronics as a slow drift, and becomes large at lower frequencies—much larger than the kT noise floor. For common seismic sensors, with tiny signals, 1/f noise is the dominant limiting factor at low frequencies.

All of the above techniques measure the motion (displacement, velocity, or acceleration) of a proof mass via tiny voltage fluctuations in either an inductive or capacitive sensing element. This inherently results in a difficult measurement problem due to the very small displacements (on the order of 10s to 1000s of nanometers), velocities (nm/s), and frequencies (0.1 to 0.001 Hz) of interest. Accordingly, an improved seismometer that is lower cost and able to measure very small displacements, velocities, and frequencies may be beneficial.

SUMMARY

Certain embodiments of the present invention may provide solutions to the problems and needs in the art that have not yet been fully identified, appreciated, or solved by conventional seismometer technologies. For example, some embodiments of the present invention pertain to a laser seismometer that measures the change in a phase modulated optical signal. The resulting system measures displacement directly, which provides a wide bandwidth and high sensitivity down to very low frequencies, while providing a solution for overcoming major noise sources, including 1/f noise and kT noise, which are unavoidable using current techniques.

In an embodiment, an apparatus includes a laser configured to emit light, a beamsplitter, and a phase modulator. The laser, the beamsplitter, and the phase modulator are configured such that light emitted from the laser is run through the beamsplitter and split into a first beam and a second beam, the first beam strikes and reflects off of a stationary proof mass, and at least some of the reflected first beam passes back through the beamsplitter, the second beam passes through the phase modulator and reflects off of a moving target, and at least some of the reflected second beam passes back through the phase modulator and is recombined at the beamsplitter with the reflected light from the first beam to generate a combined interfered signal.

In another embodiment, a phase modulated seismic interferometer includes a beamsplitter that splits an optical signal into a first beam and a second beam and a phase modulator on one side of the beamsplitter. The phase modulator is configured such that light from the second beam passes through the phase modulator and reflects off of a stationary target. At least some of the reflected second beam passes back through the phase modulator to the beamsplitter, producing a phase-modulated signal. The phase modulator changes a phase of the reflected second beam by changing an index of refraction of a material of the phase modulator, adding a time delay as the reflected second beam passes through the material.

In yet another embodiment, a phase modulated seismic interferometer includes a beamsplitter that splits light into a first beam and a second beam. The phase modulated seismic interferometer also includes a phase modulator on one side of the beamsplitter. The phase modulator is configured such that light from the second beam passes through the phase modulator and reflects off of a stationary target and at least some of the reflected second beam passes back through the phase modulator to the beamsplitter, producing a phase-modulated signal. The phase modulated seismic interferometer further includes a moving target positioned such that light from the first beam reflects off of the moving target and at least some of the reflected first beam passes back through the beamsplitter, producing a combined interfered signal when combined with the phase-modulated signal. Additionally, the phase modulated seismic interferometer includes an optical detector positioned such that the combined interfered signal interacts with the optical detector to produce a signal that can be identified with a frequency-modulated radio frequency signal at baseband, with a modulation index of $k=1$.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a laser seismometer that measures the change in a phase modulated optical signal. The resulting system measures displacement directly, which provides a wide bandwidth and high sensitivity down to very low frequencies, while providing a solution for overcoming major noise sources, including 1/f noise and kT noise, which are unavoidable using current techniques. Because displacement is directly measured in such embodiments, they have none of the drawbacks discussed above with respect to conventional seismometer technologies.

The ability to measure wide bandwidths down to extremely low frequencies at much higher sensitivities in a compact, rugged package would be of considerable interest to the oil and gas industry. Such a sensor directly improves the ability to perform wide area seismic surveys, improves detection range, and improves the ability to detect geological features of interest. Moreover, the initial development can be done using commonly available components and equipment in some embodiments, and thus, be piggybacked onto existing tests.

Unlike traditional interferometers, the laser phase in some embodiments is first modulated by a radio frequency (RF) source, which is then demodulated following detection to provide the signal of interest. The net result is a direct measurement of displacement with the effects of amplitude noise eliminated via limiting and the effects of 1/f phase noise (i.e., frequency drift, etc.) eliminated by self-interfering the signal. Because the SNR of the optical signal is strong, the technique provides a strong measure of the displacement, i.e., avoids the extremely low voltages and associated problems of traditional sensors.

Unlike a capacitive system, the system of some embodiments is strictly linear with displacement, and because the processing is done at RF frequencies, the problems associated with 1/f noise and low-SNR amplifier noise are eliminated. The system in some embodiments may have an extremely wide bandwidth and wide dynamic range, able to measure both very small and very large displacements. The system in some embodiments may be implemented using COTS fiber laser components or with discrete beamsplitters and detectors. The former allows lower costs, while the latter allows experimental flexibility, as well as the ability to go to shorter wavelengths (e.g., ultraviolet (UV)) to provide greater phase sensitivity.

Displacement Interferometer Geophone

Figure 1:
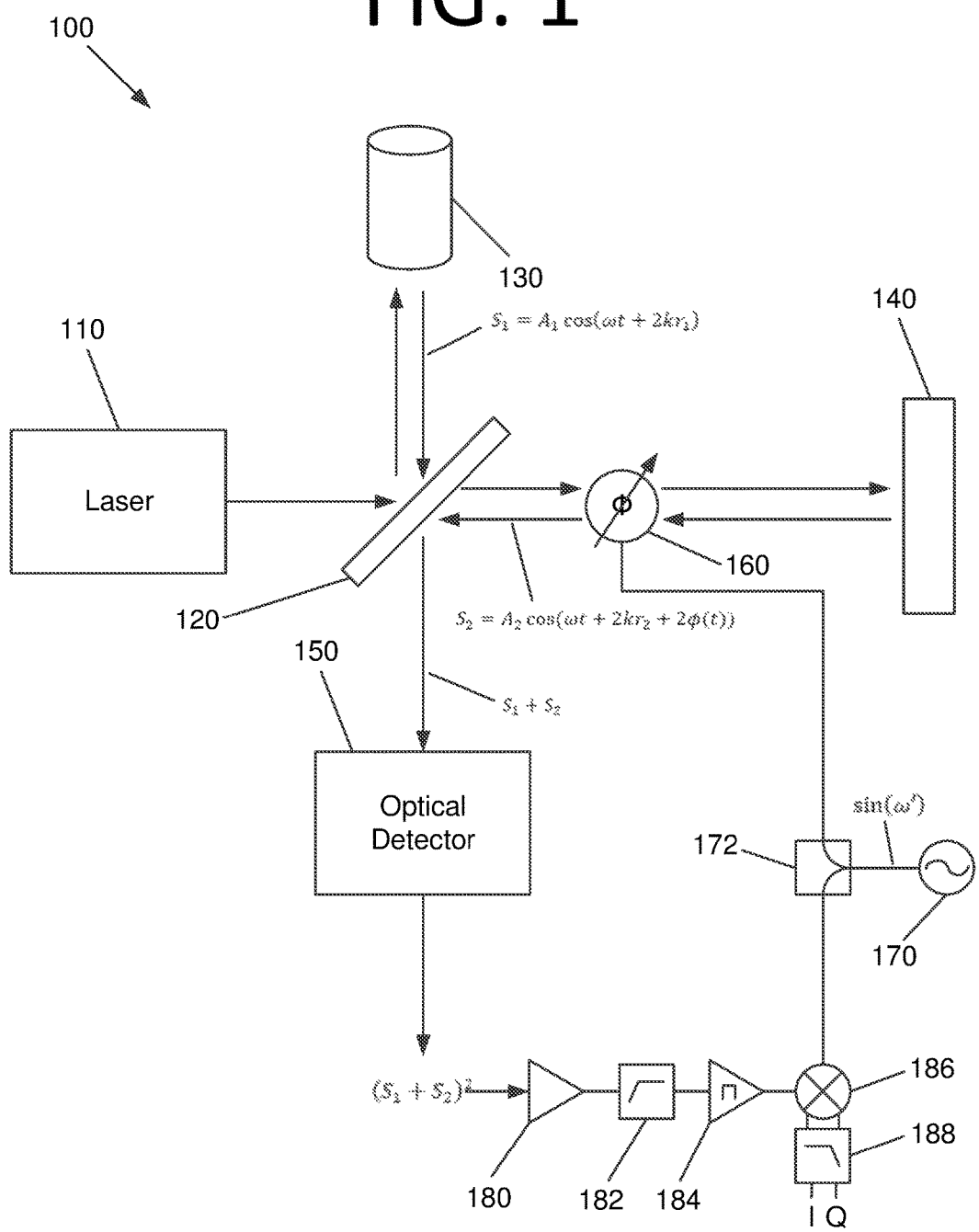
FIG. 1 is an architectural diagram illustrating a phase modulated seismic interferometer, according to an embodiment of the present invention.

FIG. 1 is an architectural diagram illustrating a phase modulated seismic interferometer 100, according to an embodiment of the present invention. Unlike a traditional interferometer, a phase modulator 160 is included on one side of the beamsplitter and RF components 170, 172, 180, 182, 184, 186, 188 are also included in this embodiment.

Light from laser 110 is passed through beamsplitter 120. One half of the beam reflects off of a moving mass 130, and at least some of the reflected light returns to beamsplitter 120, resulting in signal $$S_1 = A_1 \cos(\omega t + 2kr_1) \quad (5)$$

where $r_1$ is the distance from beamsplitter 120 to target 130.

The other half of the beam proceeds through phase modulator 160 and reflects off of stationary mass 140. At least some of the reflected light returns through phase modulator 160 to beamsplitter 120, resulting in the signal $$S_2 = A_2 \cos(\omega t + 2kr_2 + 2\phi(t)) \quad (6)$$

where $\omega$ is the modulation frequency, t is the time, $\phi$ is the phase imparted onto the signal by phase modulator 160, A is the amplitude of the laser light, and k is the wave number for the laser equal to $\omega/c$, where c is the speed of light. Phase modulator 160 is a bi-directional device that changes the phase by changing the index of refraction of a material of phase modulator 160, adding a small time delay each time the signal passes through the material.

The combined interfered signal $S_1+S_2$ passes through beamsplitter 120 and interacts with optical detector 150. Optical detector 150 is a square-law detector in this embodiment. Hence, the output is given by $$S = A_1^2 + A_2^2 + 2A_1A_2 \cos(2k\Delta r + 2\phi) + h.o.t. \quad (7)$$

where "h.o.t." stands for higher order terms. A signal generator 170 generates a sinusoidal signal at RF frequencies that passes through an RF splitter 172 and drives phase modulator 160, resulting in $$\phi(t) = \sin(\omega' t) \quad (8)$$

The resulting signal from optical detector 150 is $$S(t) = A' + B' \cos(2k\Delta r + \sin(\omega' t)) \quad (9)$$

This signal may be identified with an FM-modulated RF signal at baseband, with a modulation index of k=1. The signal contains a direct current (DC) offset, but now, the phase component appears as a sideband at the modulation frequency+$\omega'$.

Using an RF signal to modulate the phase rather than a DC offset provides at least several benefits. First, it allows the use of inexpensive, low Vpi phase modulators. Phase modulators that go to DC typically require several hundred volts to change the phase, versus a few volts for an RF-modulated device. Second, there are no issues of phase wrapping. The system of some embodiments can measure displacements of any size. Third, the signal may be treated as a modulated RF signal.

Treating the signal as an FM modulated signal allows the use of standard RF techniques. In FIG. 1, the signal is shown being amplified by a low noise amplifier (LNA) 180, filtered by filter 182 to remove the DC component, and run through a limiting amplifier 184, similar to a typical frequency modulated (FM) radio receiver. Limiting amplifier 184 removes all amplitude-noise effects, leaving only the signal of interest $$S = \cos(2k\Delta r + \sin(\omega' t)) \quad (10)$$

Figure 2A:
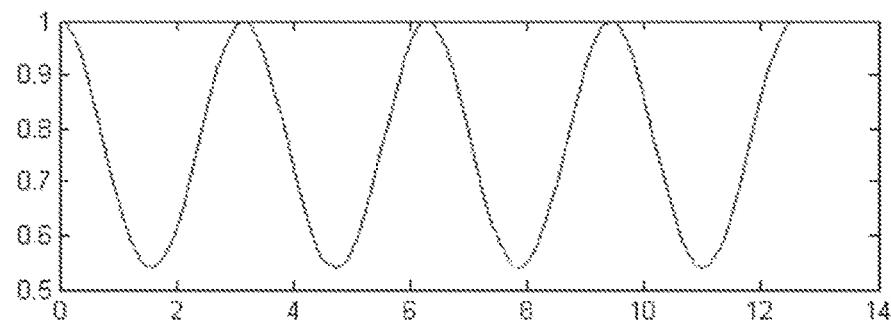
FIG. 2A is a graph illustrating a plot of the function of Eq. (10) in cos(sin(x)) form, according to an embodiment of the present invention.
Figure 2B:
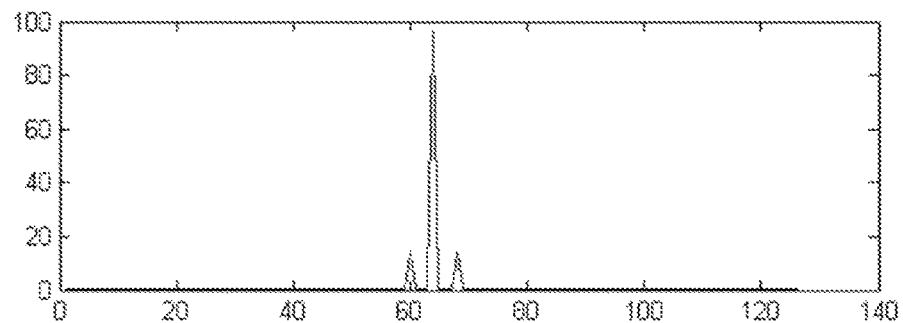
FIG. 2B is a graph illustrating a plot of the function of Eq. (10) in Fourier Transform form, according to an embodiment of the present invention.

This function may be expanded in a Fourier-Bessel expansion to give the various terms, but at low modulation index, this signal is essentially a DC signal plus a pair of sidebands. Graphs of this function are shown in graphs 200, 210 of FIGS. 2A and 2B. As expected, the signal is a sinusoid riding on top of a DC offset. At this point, the signal may be demodulated using standard FM techniques, a lock-in amplifier, etc. As shown, the limited signal is run through IQ mixer 186, using the phase modulation signal $\sin(\omega' t)$ as the local oscillator (LO). This has the effect of removing any phase noise associated with the RF source, and the resulting IQ signal from low pass filter 188 gives, after filtering, the phase component $2k\Delta r$ corresponding to the difference in displacement.

The net result is a direct measurement of displacement, with the effects of amplitude noise eliminated via limiting and the effects of 1/f phase noise (frequency drift, etc.) more or less eliminated by self-interfering the signal. Because the SNR of the optical signal is strong, the technique provides a strong measure of the displacement, i.e., avoids the extremely low voltages and associated problems of traditional sensors. Unlike a capacitive system, the system of embodiments such as that shown in FIG. 1 is strictly linear with displacement, and because the processing is done at RF frequencies, the problems associated with 1/f noise and low-SNR amplifier noise are eliminated.

The system of some embodiments is extremely wide bandwidth and wide dynamic range—able to measure very small and very large displacements. The system may be implemented using COTS fiber laser components in some embodiments or with discrete beamsplitters and detectors. The former allows for lower costs, while the latter allows experimental flexibility, as well as the ability to go to shorter wavelengths (e.g., UV) to provide greater phase sensitivity.

The system of some embodiments performs seismic measurements using a phase-modulated laser interferometer. The system may make the measurement in a fundamentally different way than traditional seismic instruments, which allows the sensor to overcome many inherent physical limitations in traditional systems. The sensor may further be designed to eliminate many sources of noise that plague traditional systems to provide a very "clean" and high sensitivity measurement. The sensor may be constructed using commercially available parts in some embodiments, and will likely be of considerable interest to the seismic community for oil and gas exploration and other applications.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a stationary proof mass;
a moving mass;
a laser configured to emit light;
a beamsplitter;
a phase modulator located on an optical path between the beamsplitter and the stationary proof mass;
a radio frequency splitter; and
a signal generator configured to generate a sinusoidal signal at radio frequencies that pass through the radio frequency splitter and drive the phase modulator, wherein
the laser, the beamsplitter, and the phase modulator are configured such that:
light emitted from the laser is run through the beamsplitter and split into a first beam and a second beam,
the first beam strikes and reflects off of the moving mass, and at least some of the reflected first beam passes back through the beamsplitter,
the second beam passes through the phase modulator and reflects off of the stationary proof mass, and
at least some of the reflected second beam passes back through the phase modulator and, along with the sinusoidal signal generated by the signal generator, is recombined at the beamsplitter with the reflected light from the first beam to generate a combined interfered signal.

2. The apparatus of claim 1, further comprising:
an optical detector configured to receive the combined interfered signal from the beamsplitter.

3. The apparatus of claim 2, wherein the optical detector is positioned such that the combined interfered signal interacts with the optical detector to produce a signal identifiable by a frequency-modulated radio frequency signal at baseband, with a modulation index of k=1.

4. The apparatus of claim 3, wherein the signal produced by the optical detector comprises a direct current offset with the phase component appearing as a sideband at a modulation frequency of $\pm\omega'$.

5. The apparatus of claim 3, further comprising:
a low noise amplifier (LNA) that receives and amplifies the signal produced by the optical detector;
a filter that receives the amplified signal from the LNA and removes a DC component thereof; and
a limiting amplifier that receives the filtered signal from the filter and removes all amplitude-noise effects, leaving only a signal of interest.

6. The apparatus of claim 5, further comprising:
an IQ mixer that receives the signal from the limiting amplifier and removes phase noise associated with a radio frequency source using a phase modulation signal $\sin(\omega't)$ as a local oscillator (LO), wherein
a resulting IQ signal gives, after filtering, a phase component $2k\Delta r$ corresponding to a difference in displacement.

7. The apparatus of claim 1, wherein the phase modulator changes a phase of the reflected second beam by changing an index of refraction of a material of the phase modulator, adding a time delay as the reflected second beam passes through the material.

8. A phase modulated seismic interferometer, comprising:
a beamsplitter that splits an optical signal into a first beam and a second beam;
a phase modulator located on an optical path between the beamsplitter and a stationary proof mass, the phase modulator configured such that light from the second beam passes through the phase modulator and reflects off of the stationary proof mass;
a radio frequency splitter; and
a signal generator configured to generate a sinusoidal signal at radio frequencies that pass through the radio frequency splitter and drive the phase modulator, wherein
at least some of the reflected second beam passes back through the phase modulator to the beamsplitter, along with the sinusoidal signal generated by the signal generator, producing a phase-modulated signal, and
the phase modulator changes a phase of the reflected second beam by changing an index of refraction of a material of the phase modulator, adding a time delay as the reflected second beam passes through the material.

9. The phase modulated seismic interferometer of claim 8, further comprising:
a moving mass positioned such that light from the first beam reflects off of the moving mass and at least some of the reflected first beam passes back through the beamsplitter, producing a combined interfered signal when combined with the phase-modulated signal.

10. The phase modulated seismic interferometer of claim 9, further comprising:
an optical detector positioned such that the combined interfered signal interacts with the optical detector to produce a signal identifiable by a frequency-modulated radio frequency signal at baseband, with a modulation index of k=1.

11. The phase modulated seismic interferometer of claim 10, wherein the signal produced by the optical detector comprises a direct current offset with the phase component appearing as a sideband at a modulation frequency of ±ω'.

12. The phase modulated seismic interferometer of claim 11, further comprising:
a low noise amplifier (LNA) that receives and amplifies the signal produced by the optical detector;
a filter that receives the amplified signal from the LNA and removes a DC component thereof; and
a limiting amplifier that receives the filtered signal from the filter and removes all amplitude-noise effects, leaving only a signal of interest.

13. The phase modulated seismic interferometer of claim 12, further comprising:
an IQ mixer that receives the signal from the limiting amplifier and removes phase noise associated with a radio frequency source using a phase modulation signal sin(ω't) as a local oscillator (LO), wherein
a resulting IQ signal gives, after filtering, a phase component 2kΔr corresponding to a difference in displacement.

14. A phase modulated seismic interferometer, comprising:
a beamsplitter that splits light into a first beam and a second beam;
a phase modulator;
a radio frequency splitter;
a signal generator configured to generate a sinusoidal signal at radio frequencies that pass through the radio frequency splitter and drive the phase modulator, the phase modulator located on an optical path between the beamsplitter and a stationary proof mass, the phase modulator configured such that light from the second beam passes through the phase modulator and reflects off of the stationary proof mass and at least some of the reflected second beam passes back through the phase modulator to the beamsplitter, along with the sinusoidal signal generated by the signal generator, producing a phase-modulated signal;
a moving mass positioned such that light from the first beam reflects off of the moving mass and at least some of the reflected first beam passes back through the beamsplitter, producing a combined interfered signal when combined with the phase-modulated signal; and
an optical detector positioned such that the combined interfered signal interacts with the optical detector to produce a signal identifiable by a frequency-modulated radio frequency signal at baseband, with a modulation index of k=1.

15. The phase modulated seismic interferometer of claim 14, further comprising:
a low noise amplifier (LNA) that receives and amplifies the signal produced by the optical detector;
a filter that receives the amplified signal from the LNA and removes a DC component thereof; and
a limiting amplifier that receives the filtered signal from the filter and removes all amplitude-noise effects, leaving only a signal of interest.

16. The phase modulated seismic interferometer of claim 15, further comprising:
an IQ mixer that receives the signal from the limiting amplifier and removes phase noise associated with a radio frequency source using a phase modulation signal sin(ω't) as a local oscillator (LO), wherein
a resulting IQ signal gives, after filtering, a phase component 2kΔr corresponding to a difference in displacement.

17. The phase modulated seismic interferometer of claim 14, wherein
the signal produced by the optical detector comprises a direct current offset with the phase component appearing as a sideband at a modulation frequency of ±ω'.

* * * * *